United States Patent [19]

Thomas

[11] 3,848,172
[45] Nov. 12, 1974

[54] YAW DAMPER SYNCHRO SYSTEM FOR AIRCRAFT

[75] Inventor: Ronald E. Thomas, Phoenix, Ariz.

[73] Assignee: Sperry Rand Corporation, Great Neck, N.Y.

[22] Filed: Aug. 30, 1972

[21] Appl. No.: 284,781

[52] U.S. Cl. ............... 318/586, 318/591, 318/648, 244/77, 318/654
[51] Int. Cl. ..................... G05d 1/08, B64c 13/18
[58] Field of Search .......... 318/580, 584, 585, 586, 318/591, 616, 617, 624, 632, 648, 649, 654, 683, 691; 244/77

[56] References Cited
UNITED STATES PATENTS

| | | | |
|---|---|---|---|
| 3,201,669 | 8/1965 | Hollmann | 318/616 |
| 3,465,256 | 9/1969 | Moses | 318/691 X |
| 3,514,719 | 5/1970 | Rhoades | 318/654 X |
| 3,555,391 | 1/1971 | Younkin | 318/624 X |
| 3,600,694 | 8/1971 | McCollum, Jr. | 318/654 X |
| 3,701,936 | 10/1972 | Martin et al. | 318/654 X |
| 3,710,223 | 1/1973 | Cottrell | 318/654 X |

Primary Examiner—T. E. Lynch
Attorney, Agent, or Firm—Howard P. Terry

[57] ABSTRACT

A yaw rate signal is derived from a conventional three wire synchro transmitter positioned by a directional gyro and supplied to a yaw axis servomotor for providing short term automatic yaw damping of an aircraft. The three wire directional gyro synchro data is converted to a linear two wire signal from which the rate of change of aircraft heading is derived. The conversion to linear two wire data results in a triangular wave having linear leading and trailing edges that are changing slope at predetermined headings and the rate data derived from this wave is tracked and held at its last value for a predetermined interval during the discontinuity or peak point reversal of the triangular wave. Also, a predetermined hysteresis is provided at each discontinuity to assure a stable signal should the aircraft be on a discontinuity heading. A clampable synchronizer responsive to the two wire heading data for providing heading error to the roll channel of an autopilot is also disclosed.

14 Claims, 5 Drawing Figures

YAW DAMPER SYNCHRO SYSTEM FOR AIRCRAFT

BACKGROUND OF THE INVENTION

1. Field of the Invention

The present invention relates generally to aircraft automatic flight controls and more particularly to automatic yaw stability augmentation, often referred to as a yaw damper system for stabilizing short term yawing of an aircraft due to wind gusts or turbulence. More specifically, the yaw damper of the present invention is of the derived rate type as opposed to the direct rate type, that is, wherein the yaw rate signal is derived from a heading displacement signal, as detected by a directional gyro for example, rather than being measured directly by a rate sensor, such as a rate gyro or integrating angular accelerometer.

2. Description of the Prior Art

Automatic yaw dampers for aircraft have been employed for a great many years and have varied in complexity from simple direct pendulum control of an aircraft rudder to sophisticated rate sensors, such as rate gyroscopes, angular accelerometers and the like operating the aircraft rudder servomotor through electronic shaping networks.

Reliable, long life, compact angular rate sensors are very expensive electromechanical precision instruments and while suitable and highly desirable and justifiable in large multi-jet military and commercial transport aircraft, their use in general aviation types of aircraft would greatly increase the cost thereof to the owners and operators of such aircraft. However, most autopilots for the general aviation aircraft market include a direction or heading reference, such as a directional gyro so that a yaw damper signal, i.e., a yaw rate signal, may be derived by differentiation of the directional gyro signal. An example of this general technique is shown in Applicant's Assignee's U.S. Pat. Nos. 2,415,819; 2,415,430; and 2,632,142 or the considerably simpler example is shown in 3,338,105. It will be noted, however, that in these prior devices complex follow-up techniques or special directional gyro pick-offs are required and in none of these is the yaw rate signal derived directly from three wire data provided by a conventional synchro transmitter positioned by the directional gyro. The derived rate and heading synchronizer concept of the present invention is completely solid state and highly reliable and provides substantial cost advantages over separate rate sensors such as rate gyros and integrating angular accelerators, especially in terms of manufacturing, installation and maintenance. For example, no separate mounting rack for a rate sensor is required, nor additional aircraft wiring installation if the aircraft's panel mounted rate of turn indicator need to be used as the yaw damper rate sensor.

SUMMARY OF THE INVENTION

The foregoing technical and economic disadvantages of prior yaw damper sensor systems are overcome by the present invention. Since most aircraft automatic pilots include a stable directional reference device, such as a directional gyro, for heading control, the present invention provides wholly electronic apparatus for deriving a yaw rate damping signal (and a heading error signal) from a conventional three wire synchro control transmitter (CT) positioned by such directional reference, such signal being characterized by high sensitivity, stability and especially linearity.

Conventionally, a three wire synchro CT comprises an a.c. excited rotor winding, usually 400 Hz, and three 120° phase displaced stator windings (usually identified as the X, Y and Z legs), the rotor winding inducing into each of the stator windings a 400 Hz voltage modulated in accordance with the angular position of the rotor winding relative thereto. For example, for a complete rotation of the rotor relative to the stator, the modulation envelope of the output of each stator winding will vary sinusoidally with a 120° phase displacement therebetween, the amplitude of the envelope being proportional to the rotor excitation voltage. Since each leg output is a sine wave and since a sine wave is substantially linear within ±30° of its zero crossing, it will be appreciated that a continuous linearly changing signal can be obtained by selective demodulation and switching techniques as the rotor rotates through 360°. Furthermore, if one of the windings, for example the Z winding, is referenced to ground, the three sinusoidal voltage envelopes are derived as follows: XZ, YZ, and by summing XZ and YZ, XY is available. The above characteristics are embodied in the present invention to convert the three wire CT output data to two wire output data and this two wire data is converted to a continuous linearly changing signal as the rotor rotates through 360°. However, by simply demodulating each leg voltage and switching at 60° intervals, a sawtooth wave results with severe discontinuities at the intervals rendering it unsuitable for rate derivation. These discontinuities are overcome with the present invention by inverting alternate sawtooth sections resulting in a triangular wave which still has discontinuities although not as nearly as severe as those of the sawtooth wave.

In accordance with the teachings of the present invention, the effect of these lesser discontinuities are removed in the derived rate signal by tracking the signal and at the instant of reversal, holding the existing rate for a short interval of time, say 50 to 100 milliseconds, which allows the rate deriving circuits to stabilize after the discontinuity is passed.

A further feature of the present invention is to provide a design hysteresis into the switching circuits, i.e., at the discontinuity or reversal, whereby to force the heading to change in the opposite direction, for example about 10° before a new crossover point is encountered.

Still another feature of the invention is the manner in which a two wire triangular wave is generated from a three wire synchro CT output.

Other objects, features and advantages of the invention not hereinabove particularly enumerated will become apparent as the description of a preferred embodiment thereof proceeds, reference being made to the accompanying drawings.

DESCRIPTION OF THE PREFERRED EMBODIMENT

Figure 1A:
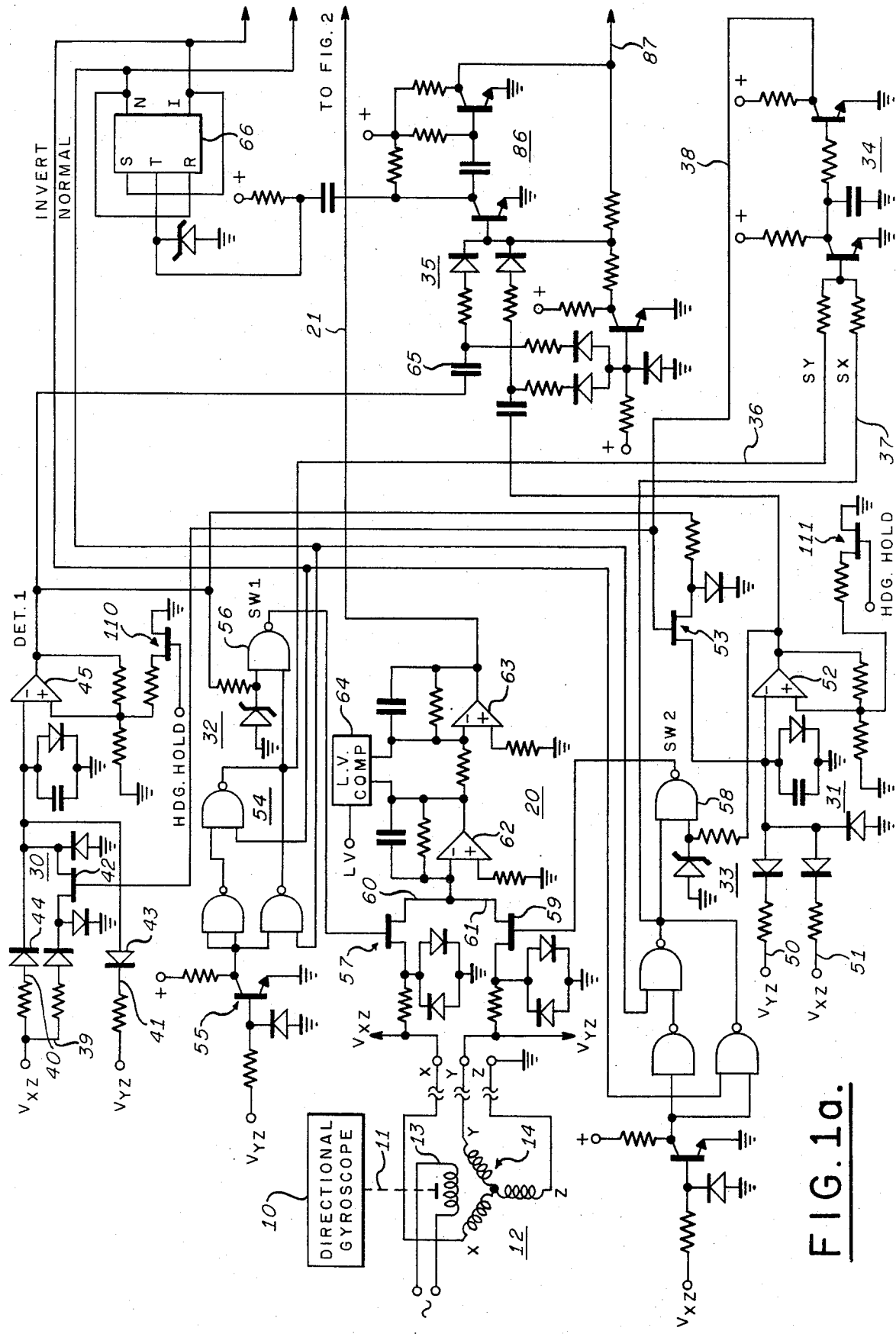
FIGS. 1a and 1b, taken together, illustrate schematically a preferred embodiment of the present invention.
Figure 2:
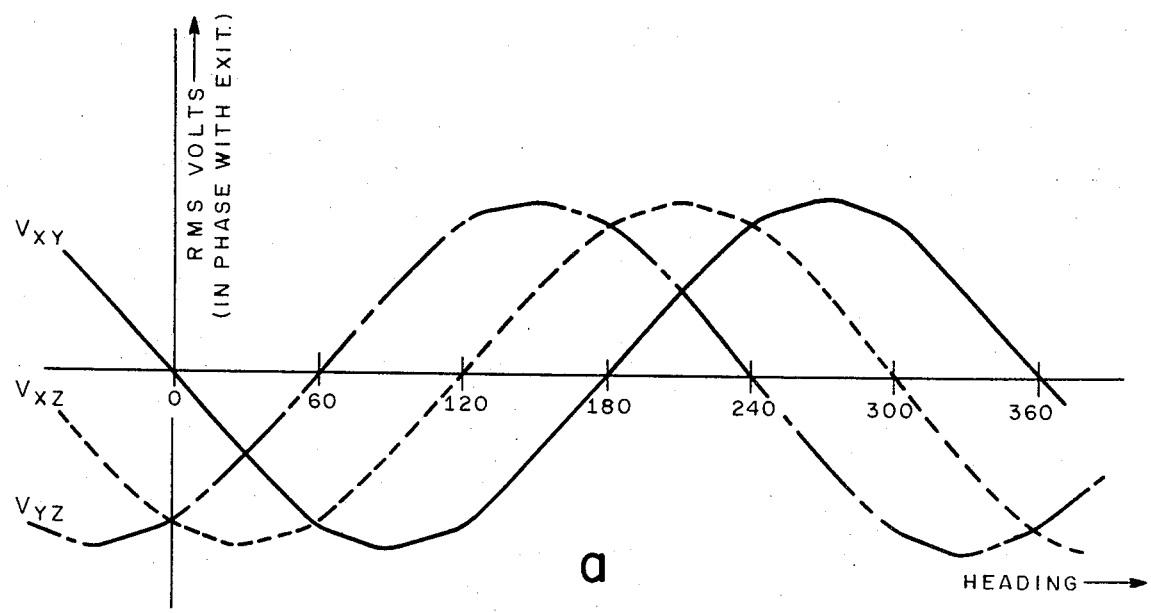
FIG. 2 depicts electrical signal waveforms useful in describing the operation of the invention.
Figure 2:
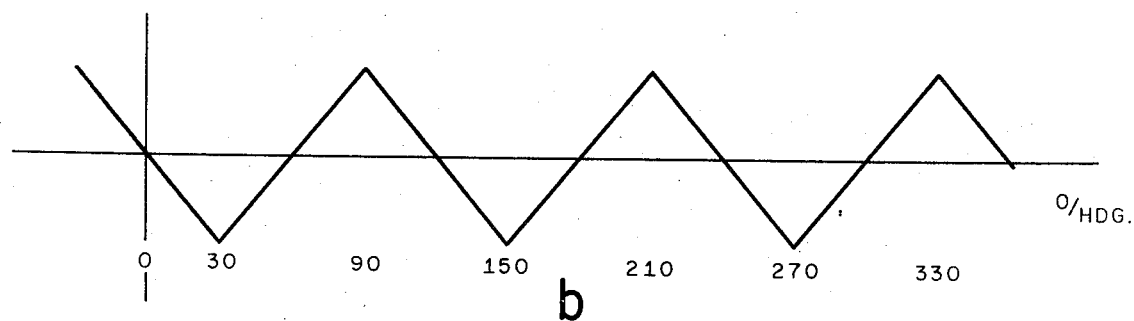
Figure 2:
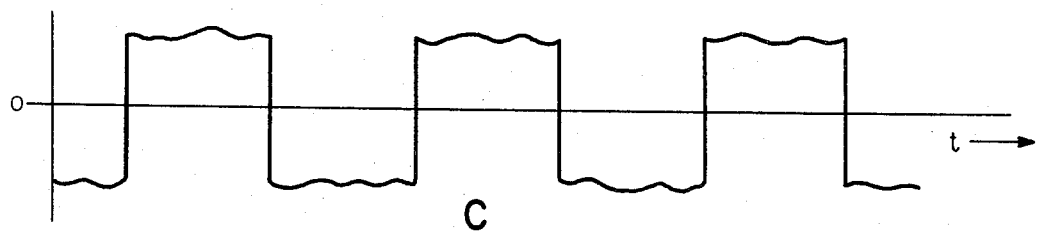
Figure 2:
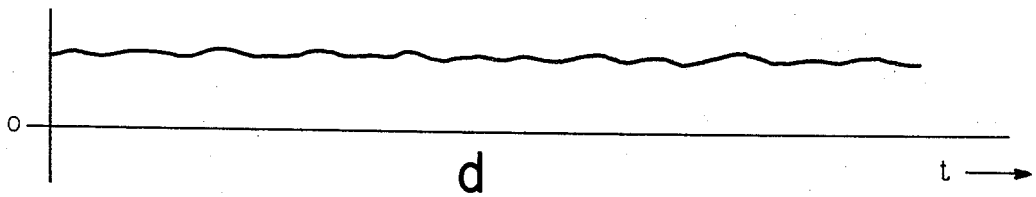
Figure 2:
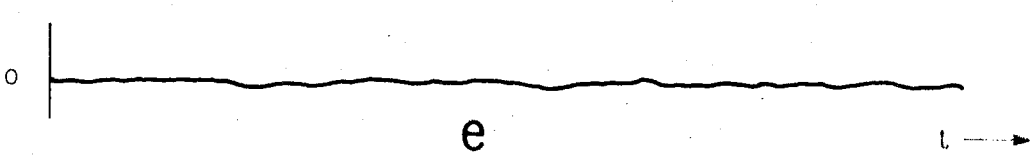
Figure 3A:
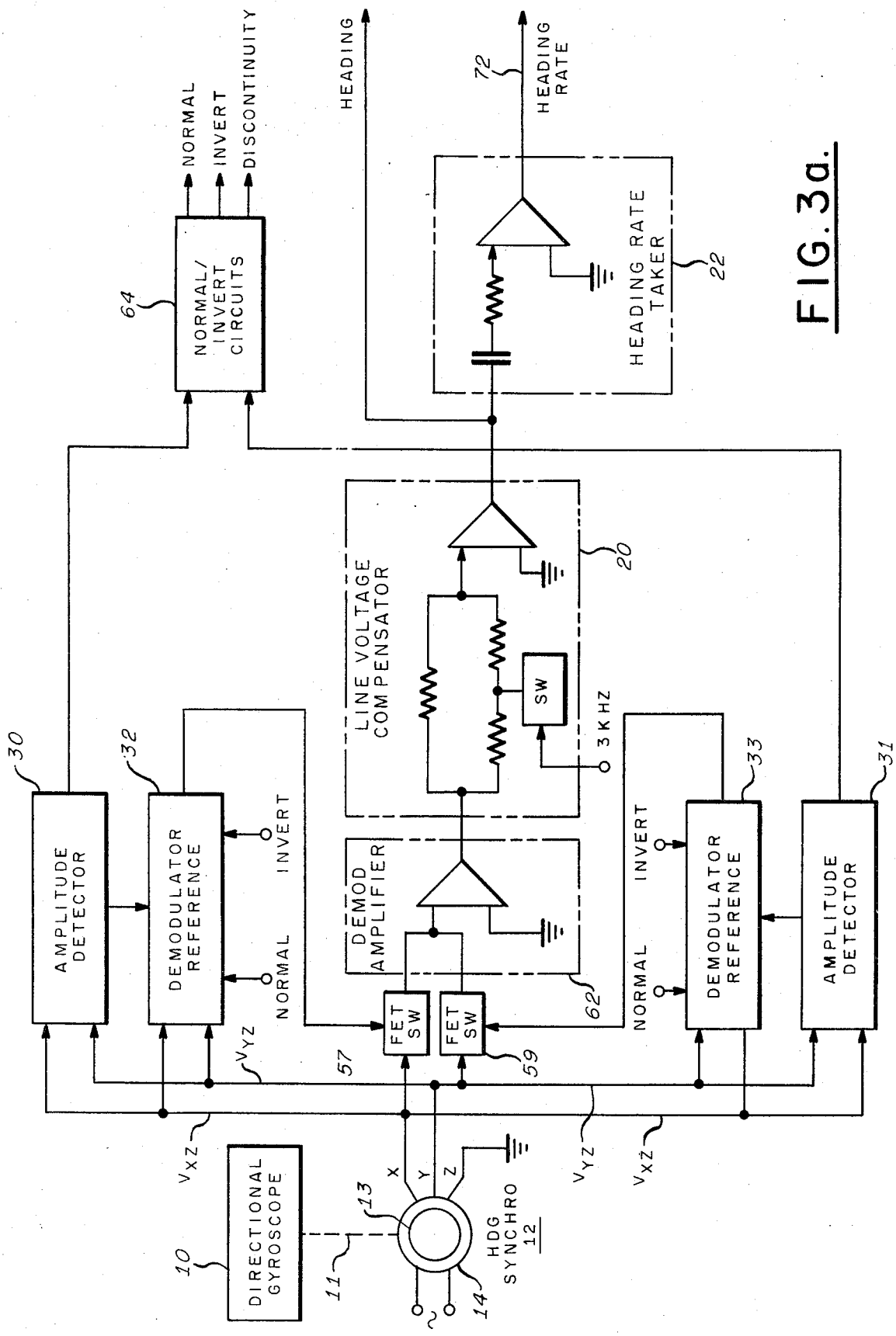
FIGS. 3a and 3b, taken together, illustrate in block-diagram form, the preferred embodiment of the present invention illustrated in the schematic diagram of FIGS. 1a and 1b.

Referring now to the drawings and particularly to FIGS. 1a and 3a, the directional sensor comprises a conventional directional gyroscope 10 which may be of the type shown in any of the above-referenced patents, the vertical or outer gimbal 11 thereof positioning a conventional synchro control transformer (CT) 12 at a 1-to-1 ratio. CT 12 comprises a single phase rotor 13 and a three phase stator 14 having windings X, Y and Z. The output characteristics of the stator windings connected as shown in FIG. 1a are shown in waveforms a of FIG. 2 as the synchro rotor 13 is rotated through one complete 360° rotation. The three sets of sine waves of course represent the modulation envelopes of the 400 Hz excitation voltage applied to rotor 13. The dashed curve $V_{XZ}$ represents the output across windings XZ to ground, the dot-dash curve $V_{YZ}$ the output across windings YZ and ground, and the solid curve $V_{XY}$ the sum of voltage across XZ and YZ. Thus the normal three wire synchro CT data is available on only the two wires X and Y and the manner in which the complete three wire information is derived and converted to linear data suitable for the derivation of its rate of change will be described in connection with the switching circuits of FIG. 1a, the actual derivation of the rate signal (and heading synchronization signal) being performed by the circuits of FIG. 1b.

Inspection of the waveforms, a, of FIG. 2 reveals that there are sufficient ±30° sectors (substantially linear portions of a sine wave) available from the three leg-to-leg voltages to cover the full 360° rotation of the synchro, and hence of the craft (assuming a 1:1 ratio between gyro movement and synchro movement). Thus, by suitable demodulation, switching and inversion, a continuous triangular wave having linear slopes is available. It should be pointed out that in the waveforms shown, the units along the abscissa are degrees independent of time. If the time factor is considered, it is evident that the slope of the linear portions of the waveforms will vary in steepness with time. Thus, for a low turn rate of the craft, the curve slope will be shallow while for high turn rates the slope will be steep; in other words, the slope of the linear portions of the triangular wave will be proportional to the turn rate of the aircraft.

Further inspection of the waveforms, a, of FIG. 2 reveals that the switching necessary to produce the triangular wave may be precisely performed by detecting voltages of appreciable magnitude rather than for example, by a zero detector. This is particularly important when low craft rates are to be detected. For example, it is desired to switch from the voltage represented by waveform $V_{XY}$ to the voltage represented by waveform $V_{YZ}$ at 30° heading. This point is detectable from a comparison of the finite voltages represented by waveforms $V_{XZ}$ and $V_{YZ}$; i.e., when $-V_{XZ} = -2 V_{YZ}$. Furthermore, it will be noted that the waveforms, a, of FIG. 2 are illustrated as demodulated modulation envelopes of the CT 400 Hz carrier. Thus, it is necessary to demodulate the signals to provide the illustrated waveforms and to provide the proper phase references for the demodulators.

Figure 1B:
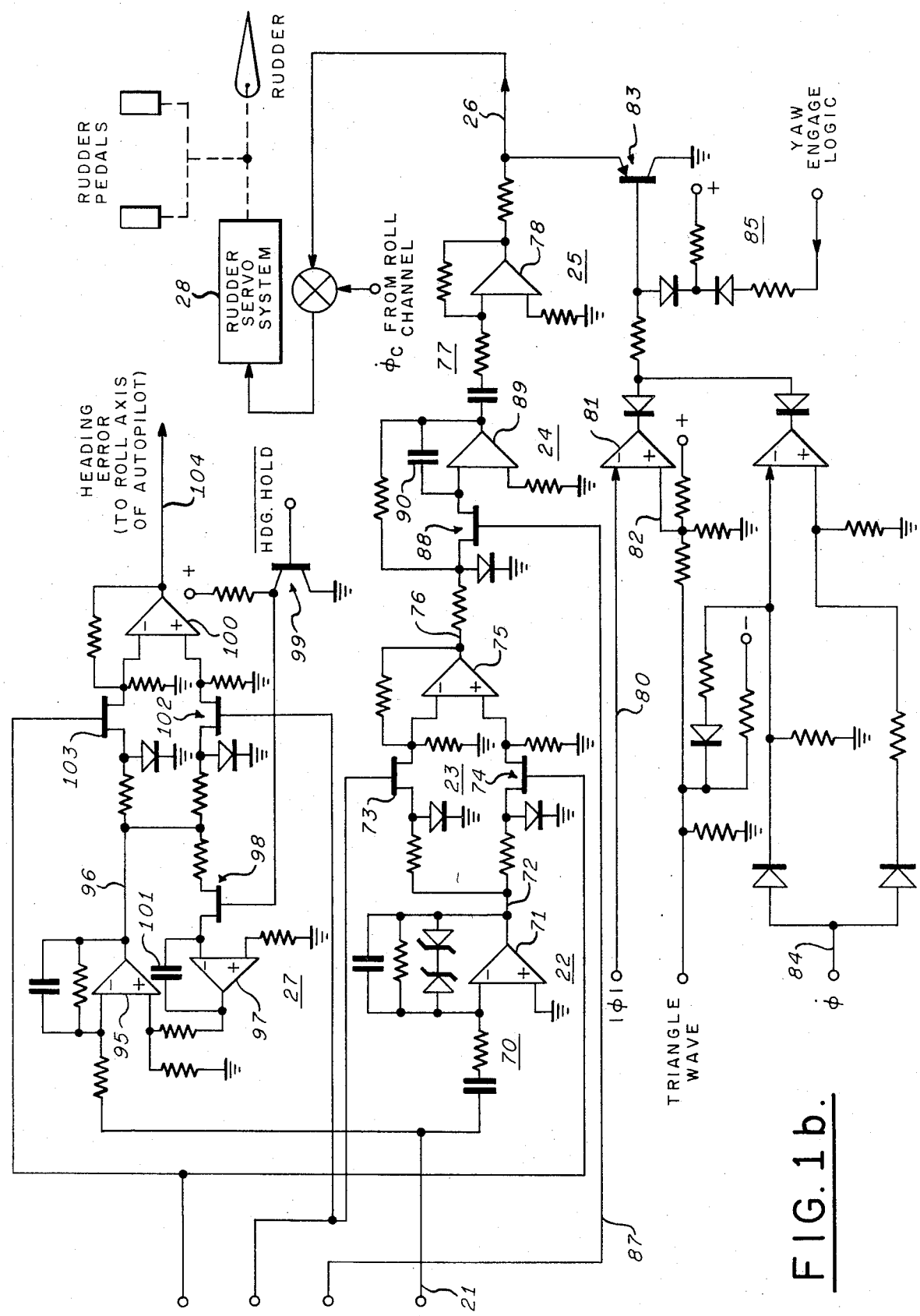
Figure 3B:
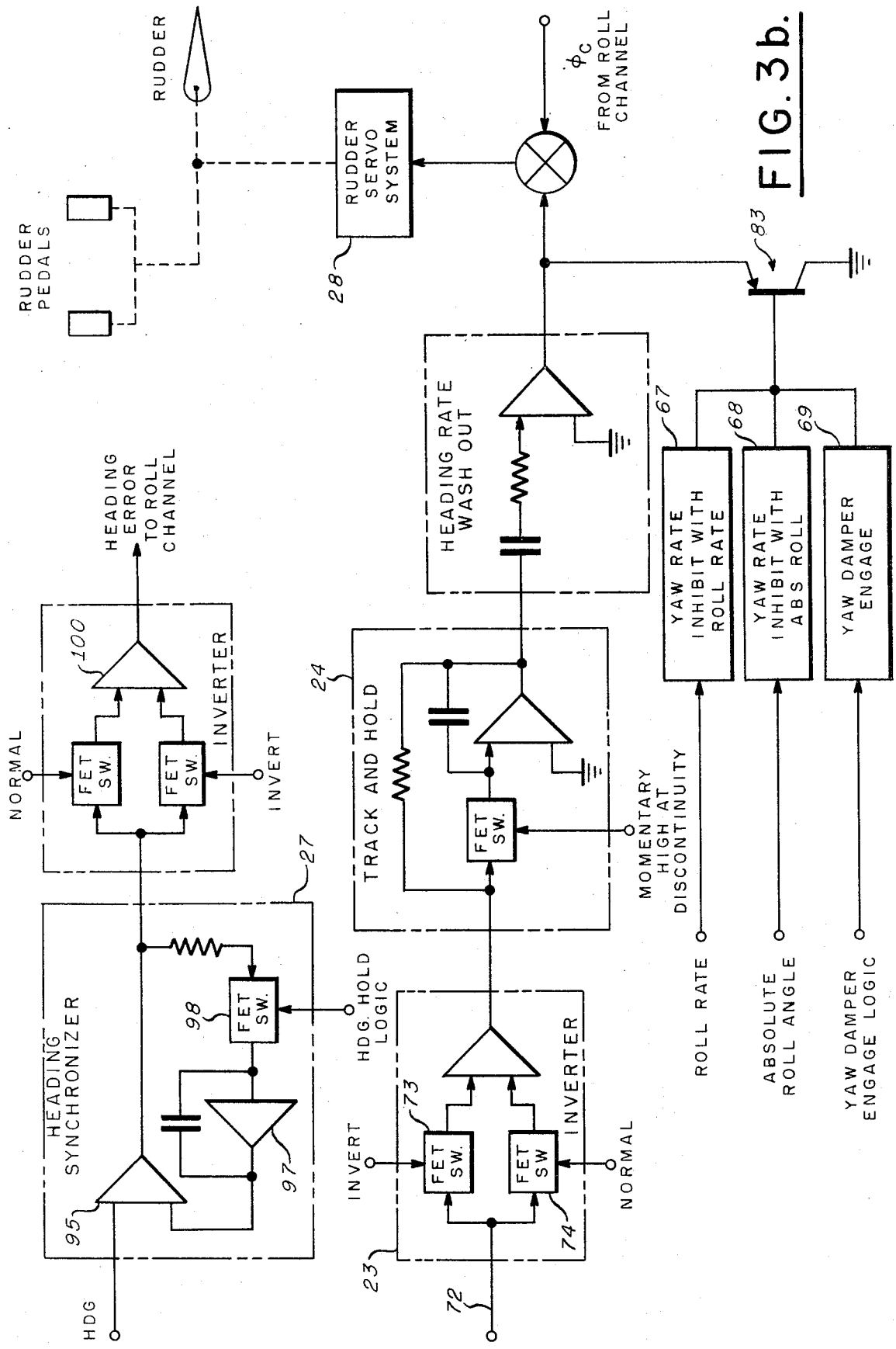

Before proceeding with a description of the detailed circuit schematic of FIG. 1a and 1b, the basic arrangement and general functions of these circuits will be set forth, reference being made to the block diagram of FIGS. 3a and 3b. The three-wire a.c. input signal from synchro 12 is converted to a two-wire d.c. triangular wave signal as shown at FIG. 2b by means of FET switches 57, 59 controlled by amplitude detectors 30, 31 and demodulator references 32, 33 respectively, and amplifier 62. Switches 57, 59 will be turning on and off to demodulate the $V_{XZ}$ and $V_{YZ}$ signals whenever the output of 32 or 33 is a demodulator rreference signal. The resulting triangular wave d.c. signal at the output of amplifier 62 which has a slope proportional to the rate of change of heading, is routed through a conventional line voltage compensator 20 to the rate taker 22 and heading synchronizer 27 (FIG. 3b). When not in the heading hold mode, switch 98 is closed and the feedback through amplifier 97 forces the output of heading synchronizer amplifier 95 to zero. Selecting the heading hold mode opens switch 98 and clamps the synchronizer resulting in a heading deviation signal being applied to inverter amplifier 100 to provide a heading error output of the proper sense to the roll channel of the autopilot.

A normal and invert circuit 64, responsive to the amplitude detectors 30, 31 provide "normal" and "invert" signals which allow for the proper sense or polarity of the output of inverter 100.

The heading rate taker circuitry 22 senses the rate of change or slope of the d.c. triangular wave at the output of demodulator 62 to provide the basic yaw damper signal. The output of rate taker 22 is routed through an inverter 23 having pair of FET switches 73, 74 which are operated depending upon the polarity required as determined by normal/invert circuit 64.

In order to assure smooth transitions between heading sectors 30°, 90°, 150°, 180°, 210°, 270° and 330° and avoid rate transients in the yaw damper system, a track and hold circuit 24 is provided. Its function is to track and then hold the last value of rate obtaining just before the crossover or discontinuity of triangular wave and hold it for a predetermined time interval, say 100 or 200 milliseconds, so that the rate circuit can settle out or stabilize on the next linear portion of the triangular wave. The heading rate signal is applied to washout circuit 24 which serves to eliminate any constant value turn rate (i.e., a constant rate turn of the aircraft) but allows any changes during this turn rate to be supplied to the yaw or rudder servo amplifier 28. Under certain conditions, it is desired to remove the yaw damper signal from the rudder servo and also of course to disengage yaw damper operation. These functions are provided by suitable logics 67, 68 and 69 controlling a transistor switch 83 which, when energized, switches the yaw damper signal to ground as will be more fully described below.

In view of the foregoing general background discussion, a detailed description of the specific circuits of a preferred embodiment of the present invention will now be provided, reference being made to FIGS. 1a and 1b.

In general, the circuits shown in FIG. 1a provide the triangular wave signal illustrated by waveform b of FIG. 2. This signal is the output of demodulator 20 appearing on lead 21 and its slopes are proportional to craft turn or yaw rate. This signal is supplied to rate taker and filter 22, (FIG. 1b) inverter 23, track and hold circuit 24, washout 25 and thence on output lead 26 to the yaw or rudder servo system 28. The aircraft control surface servosystem may be of the same type as that shown in Applicant's Assignee's copending application Ser. No. 271,867, filed July 14, 1972 in the name of Paul A. Rauschelbach and entitled "Aircraft Automatic Flight Control System." The detailed operation of the above circuits will be given below.

As also disclosed in the above copending application, it is desired to supply a signal proportional to deviations in aircraft heading from an established heading and supplying this heading error signal to the autopilot roll channel to maintain the craft on the established heading. However, when it is desired to change the craft heading, it is necessary to synchronize the heading error so no opposing signal will be supplied to the roll channel. The foregoing is accomplished by feeding the triangular wave on lead 21 to the clampable heading synchronizer 27 of FIG. 1b. Again, the detailed operation of this circuit will be given below.

The control circuits for the demodulator 20 which results in the triangular wave on lead 21 comprises, in general, amplitude detectors 30, 31 which determine switching points based on the relative amplitudes of the $V_{xz}$ and $V_{yz}$ voltages, phase detectors 32, 33 which determine the reference phases for demodulator 20, sector detector 34 which provides gross phase information for conditioning the amplitude detectors 30, 31 and sense change detector 35 which provides normal and invert information for the phase detectors 32, 33 and also for inverting the outputs of the rate taker 22 and heading synchronizer 27 as the triangular wave transitions occur.

In the following discussion of the triangular wave generation circuits and their operation, for convenience in understanding the invention, it will be assumed that the aircraft makes a constant rate turn of a little over 180° from just prior to zero heading, say 350°, the operation repeating itself from 180° on to 360°. It will also be assumed that the sense detector 35 toggles its associated flip-flop from one condition to the other at each transition. At this point it will be understood that the initial condition of the flip-flop is immaterial since it is only necessary to provide turn rate and heading error signals, i.e., not referenced to actual absolute compass or course information.

Assume the system is energized with the synchro CT at an angular position corresponding to say, 350°. At this point it is desired to provide a demodulated voltage corresponding to the value of $V_{XY}$ between 330° and 30°. The proper demodulator reference will depend upon the state of detectors 30 to 34. Consider first the state of the sector detector 34 output. It will be noted that the $V_{xz}$ and $V_{yz}$ 400 Hz voltages are in phase and therefore the logic of phase detectors 32, 33 causes (in the "normal" condition) the voltage (SY) on lead 36 to be out of phase with the voltage (SX) on lead 37 so that the output on lead 38 of sector detector 34 is "high." Consider now amplitude detector 30. Parallel circuit 39, 40 is responsive to the amplitude of $V_{xz}$ and circuit 41 is responsive to the amplitude of $V_{yz}$. Also, the impedance of each parallel leg 39, 40 is twice that of circuit 41. Since FET 42 is controlled from sector detector 34 and the signal on lead 38 is high, FET 42 open circuits parallel leg 39. Thus, if the negative half cycle voltage of $V_{yz}$ (through diode 43) is at least one half the positive half cycle of $V_{xz}$ (through diode 44) the resultant voltage at the input of op amp 45 is zero. At the 350° assumed start point the input of op amp 45 will be negative causing the output of op amp 45 to be high. Amplitude detector 31 also compares the $V_{xz}$ and $V_{yz}$ voltages. In this detector the $V_{yz}$ leg 50 input impedance is twice that of the $V_{xz}$ leg 51 impedance. Thus, if the negative half cycle voltage of $V_{xz}$ is at least one-half the positive half cycle voltage of $V_{yz}$, the input to op amp 52 will be negative and under the assumed start point the output of op amp 52 is therefore high. It will be noted that FET 53 at this point inhibits the output of detector 30 to the detector 31.

Consider now the phase detectors 32 and 33. Phase detector 32 is responsive to the phase of the $V_{yz}$ voltage and detector 33 is responsive to the phase of the $V_{xz}$ voltage. Under the start conditions assumed these two voltages are in phase with each other but out of phase with the synchro excitation voltage. Thus, in phase detector 32 transistor 55 is driven off and on by the negative and positive half cycles of the 400 Hz carrier and the inversion that takes place through the logic circuits 54 (in the "normal" condition) cause the output of AND logic 56 to be driven high and low, i.e., out of phase with $V_{yz}$, since the other input to AND gate 56 is maintained high by the output of op amp 45. The output of gate 56 thus provides the 400 Hz phase reference for the $V_{xz}$ demodulator FET 57 of demodulator 20, the FET 57 being driven out of phase with $V_{yz}$ under the assumed start conditions.

In a similar manner phase detector 33, responsive to the 400 Hz $V_{xz}$ voltage drives the output of AND gate 58, through the "normal" mode logic, in phase with $V_{xz}$, since the other input of AND gate 58 is maintained high by the output of op amp 52. The output of gate 58 thus provides the 400 Hz phase reference for the $V_{yz}$ demodulation FET 59 of demodulator 20, the FET 59 being driven in phase with $V_{xz}$ under the assumed start conditions.

Now, since demodulator FET 57 demodulates $V_{xz}$ out of phase with $V_{yz}$ and FET 59 demodulates $V_{yz}$ in phase with $V_{xz}$, under the assumed condition the d.c. voltage on lead 60 is proportional to the amplitude of $V_{xz}$ but negative in sense while the d.c. voltage on lead 61 is proportional in magnitude to $V_{yz}$ but positive in sense. These two d.c. voltages are summed at the input of op amp 62 to provide a net d.c. voltage proportional to $V_{XY}$ at the assumed start condition. As the heading change increases from 330° toward 0°, it will be appreciated from the foregoing that the positive output of op amp 62 will reduce to zero and will reverse at 0° and go negative as the heading change increases to 30°. Thus, the linear trailing edge of the triangular wave on output lead 21 is formed. It will be appreciated that op amp 62 provides a demodulator filter function in addition to amplification. Additional amplification and filtering is provided by op amp 63. Any variations in line voltage are compensated through line voltage compensator 64 in a conventional manner.

Now assume the craft continues to change heading. At 30° further switching occurs to provide the leading edge of the next portion of the triangular wave on lead 21 as will now be described.

Ignoring for the moment the feedback connection around op amp 45 of amplitude detector 30 (the purpose of which will be described below), the relative amplitudes of the positive and negative half cycles of the 400 Hz carrier at an instant beyond 30° will be seen to change the state of the output of op amp 45, i.e., it will go negative. When this occurs, output of phase detector 32 is inhibited and FET 57 is rendered nonconductive. At the same time, a voltage spike or pulse is produced by capacitance 65 of sense detector 35 which toggles flip-flop 66 to the "invert" state. The normal lead having gone low inhibits the respective normal gates of phase detectors 32 and 33 while the invert lead enables the respective invert gates of the phase detector resulting in no change in the output sector detector 34. The enabling of the invert gate of detector 32 has no effect on its output since it has already been turned off by op amp 45 going low. However, enabling the invert gate of phase detector 33 removes a phase reversal so that the output of AND gate 58 switches demodulator FET 59 out of phase with $V_{xz}$ whereby to provide on lead 61 an input d.c. voltage proportional to the actual value of $V_{yz}$ at 30° of heading. If the heading has not changed (remains at 30°), the output of demodulator 20 will not have changed. However, as the heading increases from 30° toward 60°, the slope of the waveform will change from negative to positive as shown in FIG. 2. At 60° of heading, $V_{xz}$ and $V_{yz}$ go out of phase relative to each other thereby causing the phases of the signals SX and SY to go out of phase and changing the state of sector detector 34 (i.e., turning on its output transistor and providing a ground for FETS 42 and 53). FET 42 is now conditioned for the next switching point while FET 53 clamps the output of op amp 52 to assure that AND gate 58 is maintained on (since $V_{yz}$ and $V_{xz}$ approach their critical values during this sector) and demod FET 59 conducting so that it continues to demodulate $V_{yz}$ in the proper sense as the heading changes to 90°. Thus, the linear leading edge (positive slope) of the next triangular wave is produced on lead 21 as the heading changes from 30° to 90°.

Continuing the turn, the 90° switching point is reached. This point is detected by the amplitude detector 30. Recalling that FET 42 is now conducting, the impedance of leg 39 is placed in parallel with the like impedance of leg 40 whereby when the amplitudes of $V_{xz}$ and $V_{yz}$ become equal, the output of op amp 45 changes state, i.e., goes high. AND gate 56 will be conditioned on while sense detector 35 will trigger flip-flop 66 to toggle it to its "normal" state. The output of op amp 45 is fed back to the input of op amp 52 through FET 53. This assures that the input of op amp 52 goes positive changing the state of its output, i.e., its output goes low, thereby inhibiting AND gate 58 maintaining demodulator FET 59 non-conducting. With the normal lead high, the normal gate of phase detector 32 is on and invert gate off whereby AND gate 56 and demodulator FET 57 is switched on and off out of phase with $V_{yz}$ thereby demodulating the positive half cycles of $V_{xz}$. The d.c. input of op amp 62 will therefore decrease as heading changes to 120°. At 120° SX and SY go in phase and sector detector 34 goes high conditioning the amplitude detectors 30 and 31 for the next switching point. As $V_{xz}$ goes positive, the demod FET 57 d.c. output goes negative up to 150° of heading. The output of op amps 62 and 63 thus supplies the next linear trailing edge of the triangular wave. Since the remaining cycles of the triangular wave, i.e., from 150° to 330° is produced by a substantial repetition of the foregoing operation, the detailed description thereof will not be repeated.

Thus, by the present invention there is provided a series of linearly changing d.c. voltages proportional to changes in aircraft heading and the use of these voltages in deriving signals proportional to craft rate of turn and heading error will now be described, reference being made primarily to FIGS. 1b and 2c, d and e.

As stated above, the waveforms of FIGS. 2a and 2b are referenced to degrees of turn rather than to time. However, these waveforms also may represent the voltages depicted at some finite rate of turn, which for example may be a 5° per sec rate of turn. It will also be recalled that the slope of the triangle wave leading and trailing edge varies in proportion to turn rate, for a 2° per second rate of turn the slope would be less steep than depicted in FIG. 2b while for a 10° per second turn rate their slope would be much steeper.

The triangular wave produced on lead 21 by the circuits of FIG. 1a is applied to the rate of turn signal generating circuits 22 through 26 of FIG. 1b and to the heading synchronizer and heading error generating circuits 27 thereof. The signal on lead 21 is applied through RC network 70 to the input of op amp 71 which through its feedback circuits serves to provide at its output 72 a filtered signal proportional to the rate of change of the signal on lead 21 having a predetermined frequency bandpass, say on the order of fifteen radians per second. This signal is represented by waveform C of FIG. 2 and it will be noted that each time the slope of the triangular wave reverses from positive going to negative going etc., the rate of change thereof abruptly reverses sense and then varies in proportion to the slope of the triangular wave. Clearly, if the actual rate of turn were higher, the amplitude of the rate variation would increase and vice versa if the actual turn rate were lower than depicted.

In order to render the signal represented by waveform C of FIG. 2 useful for the yaw damper function, these abrupt discontinuities are eliminated by means of the normal and invert circuits 23. It will be recalled that each time a switching of the demodulator network 20 occurred, the flip-flop 66 was toggled from normal to invert, etc. through sense circuit 35. The normal and invert outputs of flip-flop 66 are therefore used alternately to control normal and invert FETs 73, 74, respectively of circuit 23. Thus, when the normal FET 73 is rendered conductive, the invert FET 74 is non-conductive and the positive rate variation of the signal represented by waveform C of FIG. 2 is passed to the negative input of summing op amp 75 while when invert FET 74 is rendered conductive and the normal FET 73 is non-conductive, the negative rate variation of waveform C is passed to the positive input of op amp 75. Therefore, the amplified output of op amp 75 on lead 76 is a varying d.c. signal whose amplitude is proportional to the actual craft rate of turn as illustrated by curve d of FIG. 2 (illustrating a 360° turn at some rate with slight perturbations). This signal is passed through track and hold circuit 24, the purpose of which will be described below, to washout circuit 25 comprising RC circuit 77 and op amp 78 to thereby provide an output signal on lead 26 depicted by waveform e of FIG. 2 proportional to the turn rate of the aircraft. The primary function of washout circuit 25 is to attenuate the rate signal output under steady state turn rates of the aircraft, i.e., when changes in craft heading are commanded by the human pilot or through the autopilot as explained in detail in the aboveidentified copending application.

It is desired to completely cut out or inhibit the turn rate signal to the rudder or yaw damper servo system 28 under certain conditions, i.e., when the bank angle of the aircraft exceeds a predetermined value, say 45°; and for when the roll rate of the aircraft exceeds a predetermined value, say 8° per second. One of the more significant reasons to inhibit the yaw rate command to the rudder servo 28 when the absolute value of craft bank angle exceeds 45° arises from the fact that the yaw rate signal is derived from a directional gyro. As is known, the fact that the d.g. gimbal is pivoted parallel to the aircraft Z axis and the d.g. rotor case is pivoted on a horizontal axis, significant errors develop in the vertical axis pick-off when the aircraft banks beyond, say, 45° due to the Hooke's joint effect. Thus, in FIG. 1b a signal proportional to the absolute magnitude of the bank angle is supplied on lead 80 and applied to one input of op amp 81. It is desired to slowly cut off the rate signal to eliminate any sudden yaw transients. This is accomplished through an "easy on" technique. As disclosed in the above-referenced copending application, the rudder servo is driven by a pulse width type of servo amplifier which requires a triangular reference wave for the generation of the variable pulse width. This triangular wave, suitably attenuated and biased above ground is applied through lead 82 to the other input of op amp 81. The attenuation and bias is selected relative to the bank angle signal such that between about 43° and 47° of bank angle, variable pulse width signals from op amp 81 turns PNP transistor 83 from off to on at an increasing pulse width, thereby slowly attenuating the rate signal on lead 26 to ground. It will be appreciated that this bank angle cut-out may be eliminated for relatively high bank angles by compensating the output of the d.g. signal for the bank angle error. This may be accomplished in a number of ways, such as disclosed in Applicant's Assignee's U.S. Pat. No. 3,259,822. Operationally, yaw damper cut out at very high bank angles is always considered desirable.

It is desired to inhibit the yaw rate signal to the yaw servo when the roll rate exceeds say 8° per second in order to achieve smooth and transient free turn entry and turn exit and to reduce undesired roll to yaw coupling effects inherent in many aircraft configurations. For this purpose, a signal proportional to roll rate is applied on lead 84. Again, this signal is readily available from the autopilot disclosed in the above-mentioned copending application of which the yaw damper of the present invention is a part. The above "easy on" and "easy off" feature is obtained in a manner similar to that described above and will not be repeated.

The yaw damper of the present invention is engaged and disengaged by yaw engage logic 85 as described in more detail in the above-referenced copending application.

In accordance with the teachings of the present invention, means are provided for tracking the rate of turn signal over its linear portion and at each discontinuity (i.e., at the reversal of sign of the triangular wave) holding the last value of the signal for a predetermined interval until the discontinuity is past and the rate taking and inverting circuits settle out or stabilize on the next linear portion. This is accomplished by the track and hold circuit 24 of FIG. 1b.

Returning briefly to FIG. 1a, it will be recalled that sense circuit 35 is triggered by amplitude detectors 30 and/or 31 at each change in sense of the triangular wave on lead 21. Sense circuit 35 includes a "one shot" circuit 86 that is connected via lead 87 to FET 88 so that at each discontinuity FET 88 is rendered non-conducting whereby the rate signal on lead 76 is interrupted for a period determined by the RC time constant of the one shot 86. A typical value for the duration of the interrupt pulse from one shot 86 is 50 to 100 milliseconds which is long enough for the rate circuit 22 to recover from the discontinuity. Normally, the rate signal on lead 76 is applied to the input of op amp 89 and during such normal operation, the feedback condenser 90 is charged to the value of the rate signal. When FET 88 fires, the op amp 89 input is severed from the signal on lead 76 but the condenser 90 feeds its stored charge to the amplifier input to maintain its output at the last value of the rate signal. In this manner, no rate transients due to the discontinuities in the heading triangular wave appear at the yaw damper servo input.

In most automatic flight control systems for aircraft including that one disclosed in the referenced copending application, one of its operating modes is the heading hold (HDG HOLD) mode. In this mode aircraft heading is controlled through a heading error-to-bank angle signal to maintain the craft heading at that established at selection of the mode. The heading synchronizer circuit 27 of FIG. 1b provides this signal. Assume the autopilot is in some mode other than HDG HOLD. The heading signal from d.g. 10 represented by the triangular wave signal on lead 21 from three wire to two wire converter 20 is applied to the input of op amp 95 (which also provides some noise filtering) which supplies at its output 96 a d.c. voltage proportional to the heading of the craft having the triangular wave from FIG. 2b. This signal is applied to the input of op amp 97 connected in feedback around op amp 95. Since the autopilot is not in heading hold, FET 98 is rendered "conductive" through the ground supplied by (HDG HOLD) logic transistor 99. This feedback op amp 97 therefore serves to maintain the input at op amp 100 at zero and no heading signal is supplied to the autopilot roll channel.

In the heading hold mode, however, HDG HOLD logic transistor 99 is turned off isolating the feedback op amp 97 from the heading signal on lead 96. However, the last value of the heading signal had been stored on op amp feedback condenser 101 and therefore the output of op amp 97 sets the reference for op amp 95 at the heading that existed at the time of heading hold selection so that the signal on lead 96 is therefore proportional to heading error. It will be noted that it is necessary to invert this signal as described above in connection with the rate signal. For this purpose the "normal" and "invert" signals from flip-flop 66 are again used to control FETs 102 and 103, respectively to provide the heading error signal at the output 104 of summing op amp 100 in the correct sense for the heading sector in which the aircraft is flying.

In accordance with a further teaching of the present invention, means are provided for assuring transient free heading rate and heading error signals when the heading of the craft happens to coincide with one of the discontinuity points of the triangular waveform signal. For this purpose intentional hysteresis has been supplied at these points so that once a switching has taken place at one point or heading value, that switching point will be shifted back or forward as the case may be a predetermined number of degrees so that a reverse of aircraft heading back toward that point will not trip the switches until the newly established switching heading is reached. This feature is provided at the amplitude detector op amps 45 and 52 of FIG. 1a. The output of each of these amplifiers is fed back to their inputs through an impedance network the values of the resistances being selected such that when the op amp is "on," supplying say a predetermined finite switching output, the predetermined voltage fed back to the op amp input biases the amplifier input and effectively alters the ratio of the $V_{xz}$ and $V_{yz}$ voltages required to trigger the op amp and switch its output. For example, assuming an increase in heading through, say 330°, the ratios of the magnitudes of $V_{xz}$ and $V_{yz}$ are such that the outputs of op amps 45 and 52 are positive and feedback positive voltages to their inputs. The effect of this is to bias the op amp inputs so that should the heading of the craft reverse, the normal 330° switching point will now be 320°. The same operation occurs when the heading decreases through a switching point and then increases back through it.

In the heading hold mode of the autopilot, no switching is permitted to occur. This is possible since the autopilot will maintain the heading within a few degrees and even at a normal switching point, the heading error is sufficiently linear to provide proper control. Thus, in the heading hold mode the HDG HOLD logic controls FETs 110 and 111 such that they bias the input of the op amp 45 and 52 so high that the amplifiers cannot switch and are thereby rendered ineffective.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. In a lateral axis control system for an aircraft automatic flight control system, the combination comprising
   a stable directional reference means,
   means including a synchro control transformer having a rotor part positioned by said reference means and a stator part fixed to the aircraft and switching, demodulating and inverting means controlled by the relative positions of said rotor and stator parts for providing a continuous triangular wave d.c. signal voltage having substantially linear leading and trailing edge sectors corresponding to variations in aircraft heading between substantially plus and minus thirty degree sectors of aircraft heading and points of discontinuity at the leading and trailing edge junctions of said triangular wave,
   means responsive to said d.c. signal for deriving a signal proportional to the slope of said leading and trailing edge sectors and thereby proportional to the rate of change of aircraft heading, and
   means responsive to said switching means for tracking and holding the value of said rate signal at said points of discontinuity for a predetermined time interval whereby to eliminate any rate signal transients at said points of discontinuity.

2. The lateral axis control system as set forth in claim 1 wherein said directional reference means comprises a directional gyroscope.

3. The control system as set forth in claim 1 wherein said control transformer rotor includes a single phase winding excited by an a.c. carrier voltage and said stator includes a plurality of equiangularly displaced output windings for providing a corresponding number of a.c. output signals each sinusoidally modulated in accordance with the angular position of said stator with the respective ones of said output windings and each modulation component bearing a predetermined relation with the heading of said aircraft.

4. The control system as set forth in claim 3 wherein said demodulating means includes first switch means responsive to said output signals for converting said a.c. output signals to d.c. output signals, and second switch means responsive to predetermined relative magnitudes and predetermined phases of said modulated a.c. output signals for controlling said first switch means.

5. The control system as set forth in claim 4 wherein said predetermined relative magnitudes bear predetermined ratios corresponding to said aircraft headings.

6. The control system as set forth in claim 5 wherein said predetermined magnitude ratios correspond to craft headings between which said sinusoidally modulated output signals are substantially linear.

7. The control system as set forth in claim 6 wherein further predetermined phases correspond to the phases of said a.c. carrier voltage. change.

8. The control system as set forth in claim 5 wherein said tracking and hold means is initiated by said predetermined ratios of the magnitudes of said a.c. output signals.

9. The control system as set forth in claim 5 furthe including hysteresis means responsive to said predetermined magnitude ratios for altering said magnitude ratios once said predetermined magnitude ratio is reached in one direction of heading chane.

10. The control system as set forth in claim 9 wherein said hysteresis means comprises an amplifier means responsive to said predetermined magnitude ratios and means responsive to the output of said amplifier means for feeding back a signal to its input whereby to bias said amplifier input.

11. The aircraft control system as set forth in claim 3 wherein said means for deriving said rate signal includes further means responsive to said inverting means for inverting the sense of said rate signal for alternate sectors of said triangular wave d.c. signal.

12. The aircraft control system as set forth in claim 3 further including heading synchronizing means responsive to said triangular wave signal, heading hold switching means for clamping said synchronizer at the heading then obtaining, and further switching means responsive to said heading hold switching means for rendering said triangular wave switching means ineffective whereby to provide a heading error signal at the heading then obtaining.

13. The control system as set forth in claim 12 further including means responsive to said inverting means for inverting the sense of said heading error signal for alternate sectors of said triangular wave d.c. signal.

14. The aircraft control system as set forth in claim 2 further including inhibit means responsive to the roll attitude of said aircraft for inhibiting said rate signal upon said roll attitude exceeding a predetermined value, whereby to avoid rate error signals produced by gimbal error effects of said directional gyroscope.

* * * * *